July 18, 1950
J. W. ASH
2,515,685
FISH LANDING DEVICE
Filed Sept. 30, 1946
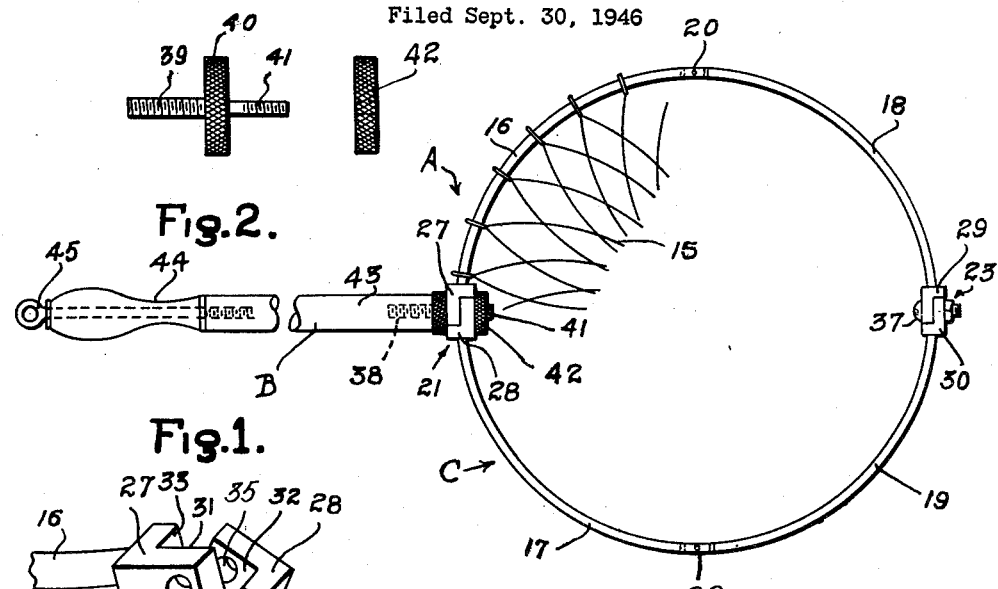
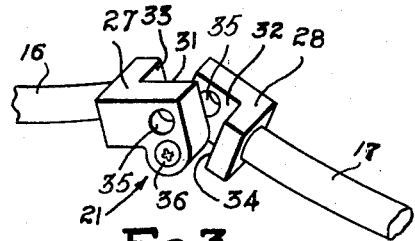
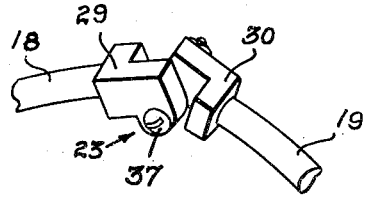
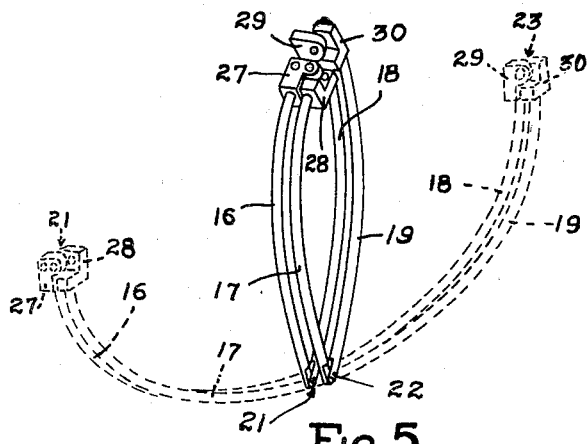
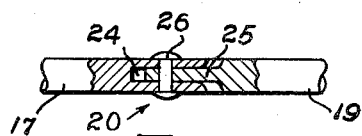
INVENTOR
J. W. ASH
By: Fetherstonhaugh & Co.
ATT'YS Patented July 18, 1950

2,515,685

UNITED STATES PATENT OFFICE 2,515,685

FISH LANDING DEVICE

James William Ash, Windsor, Ontario, Canada

Application September 30, 1946, Serial No. 700,320

3 Claims. (Cl. 43—12)

This invention relates to a fish landing device and in particular to landing nets of the class used as an aid in the landing of small game fish.

Nets of this character are a general necessity for the successful landing of game fish from the water and most fishermen desire to carry one as part of their equipment. They usually comprise a ring rigidly secured to a handle and adapted to support a net for lifting the fish from the water and are extremely bulky and awkward to pack. They cannot be carried in the average tackle box because of the large net supporting ring and when carried must be taken along as a separate piece, which is easily lost or misplaced. I have devised a landing net which is collapsible to fit into the average tackle box, thus eliminating the disadvantages in the prior art.

It is, therefore, an object of the present invention to produce a net in which the ring which supports the net is collapsible into a small space, but which can be rigidly locked in a simple manner to support the net in an operative position.

With these and other objects in view the invention generally comprises a ring, adapted to support a landing net, rigidly secured to a handle. The ring is formed from a plurality of pivotally connected arcuate segments which can be conveniently locked in an operative position to form the ring and which can be folded together when unlocked so that the net can be stored in the small amount of space in a fisherman's kit.

The net supporting ring is preferably made detachable from the handle. The invention will be fully understood after reference to the following detailed specification taken in conjunction with the drawings.

In the drawings:

Fig. 1 is a plan view of an embodiment of the invention showing the ring locked in operative position with part of the depending landing net omitted for simplification of drawing.

Fig. 2 shows a nut and bolt for rigidly holding the net supporting ring to the handle.

Fig. 3 and Fig. 4 are enlarged perspective views of pivotal connections between adjacent ring segments.

Fig. 5 is a view showing the net supporting ring detached from the handle and folded into a small space.

Fig. 6 shows a type of pivotal connection partly in section which is preferably used in conjunction with the connections shown in Fig. 3 and Fig. 4.

Referring to the drawings and particularly to Figure 1, A indicates a fish landing device as a whole, embodying a handle B and a ringlike element C which is designed to carry a net 15. This structure is, according to the present invention, formed to provide a collapsible article but which, in the rigid setup position as shown in Figure 1, provides an article corresponding in general detail with the average fish landing net.

According to the present invention, the handle B is detachably connected to the ringlike element C, preferably adjacent to a point of pivotal connection in the foldable ringlike element so that, when so connected, the whole structure is rigidly locked.

A preferred form of construction of ringlike element consists in forming it in four segmental sections 16, 17, 18 and 19 pivotally connected at the points 20, 21, 22 and 23. The pivot points 21 and 23 are located along a common axis substantially in the plane of the ring and will permit the ringlike element to be folded in half to provide a semicircular, partially folded element while the pivot points 20 and 22 have their pivot points at right angles to the plane of the ring and permit the partially folded ringlike element to be folded again to a more compactly folded unit. The action in question is aptly illustrated as between the folded dotted line position in Figure 5 and the double folded full line position in the same figure. In fact, the structure is such that the segments cannot be swung about the pivot points 20 and 22 until the segments have first been swung to partially folded position on the pivots 21 and 23. Therefore, when the ringlike element is in setup position and the pivot point 21 is locked, the ring is necessarily held rigid and cannot be collapsed.

The illustrated detail construction of the ring is as follows:

The connections 20 and 22 are shown in sectional detail in Figure 6. One of the connected segments is grooved as at 24, parallel to the plane of the ring 15, to receive a tongue 25 formed on the other connected segment. A pin 26 is passed through the tongue and the groove perpendicular to the plane of the ring 15 to allow the connected segments to pivot about an axis perpendicular to the plane of the ring.

The connections 21 and 23 are shown in detail in Figures 3 and 4, respectively. The corresponding ends of the segments 16 and 17, and 18 and 19 are provided with mating heads 27 and 28, and 29 and 30, respectively, which, when connected, form the pivotal connections 21 and 23. The heads 27 and 28 are in effect recessed on opposite faces to form the mating surfaces 31 and 32 and the opposed shoulders 33 and 34. These heads are orificed as at 35 and the pivotal point 21, established by the pivot pin 36, is offset from the orifices 35 which are aligned with one another when the segments in question are set up to form the ringlike element C. The heads 29 and 30 are of identical construction with respect to the heads 27 and 28 with the exception that they are not orificed apart from the orificing necessary for the passage of the pivot pin 37 therethrough. It will be appreciated, therefore, that when the segments are disposed in the setup position to form the ringlike element C the shoulders 33 and 34 engage the end of the cooperating head, thus to dispose the orifices 35 in alignment. Therefore, by passing a suitable locking pin through the orifices 35, the segments may be rigidly locked in the setup position.

The locking means may conveniently form part of the means of attachment of the handle and such a construction is here illustrated.

In this preferred form of construction the handle is provided with a screw threaded socket 38 designed to receive the threaded shank 39 carrying the preferably knurled disc 40 from the opposite surface of which projects the screw threaded locking pin 41. The locking pin 41 is designed to pass through the aligned orifices 35 in the heads 27 and 28 and to project partially beyond the head 28 so that the locking nut 42 may be threaded thereon to lock the segments in rigid setup position as well as to secure the so-formed ringlike member C on the handle.

Preferably, the handle B comprises an inner part 43, and an outer part 44 secured to the outer part by means of the bolt 45 as illustrated in Figure 1.

From the above it will be apparent that I have provided a fish landing device which can be disassembled and packed to occupy a small amount of space and conveniently fit into the average fisherman's kit.

What I claim as my invention is:

1. In a fish landing net, a handle, four arcuate segments pivotally connected together adjacent their free ends to cause them to be operable between a folded position and a set up position in which they form a net supporting ring, the pivotal connection between said segments being arranged in two pairs, the connections in each pair being diametrically opposed to each other when the segments are moved to the said ring position, the connections in one of said pairs having a common pivotal axis when said ring is moved to a set up position, the connections in the other of said pairs having their respective axes in parallel spaced apart relation to each other and at right angles to a plane passing through said above mentioned common axis, when the ring is operated to said set up position; locking means for locking the net supporting ring in a set up position at one end of said handle, including a pin adapted to rigidly connect with said handle, the free ends of the segments joined by at least one of said pivotal connections having a common axis being bored in parallel spaced apart relation to said pivotal axis, said bores being adapted to align when the segments are operated to a set up position to pass over said pin, and means for retaining said ring on said pin whereby to lock said segments in a set up position at one end of said handle.

2. In a fish landing net, a handle, four arcuate segments pivotally connected adjacent their free ends to cause them to be operable between a folded position and a set up position in which they form a net supporting ring, the pivotal connections between said segments being arranged in two pairs, the connections in each pair being diametrically opposed to each other when the segments are moved to the said ring position, the connections in one of said pairs having a common axis when said ring is moved to a set up position, the connections in the other of said ring pairs having parallel spaced apart pivotal axes disposed at right angles to a plane passing through said above mentioned common axis when the ring is operated to a set up position; locking means for locking said net supporting ring in a set up position, including a pin rigidly secured at one end to an end of said handle and threaded at its free end, the free ends of the segments joined by at least one of said pivotal connections having a common axis being bored in parallel spaced apart relation to said pivotal axis, said bores being adapted to align when the segments are operated to a set up position to pass over the free end of said pin, and a threaded locking nut adapted to thread on to the free end of said pin to lock said net supporting ring in a set up position thereon at one end of said handle.

3. In a fish landing net, a handle, four arcuate segments pivotally connected adjacent their free ends to cause them to be operable between a folded position and a set up position in which they form a net supporting ring, the pivotal connections between said segments being arranged in two pairs, the connections in each pair being diametrically opposed to each other when the segments are moved to said ring position, the connections in one of said pairs having a common axis when said ring is moved to a set up position, the connections in the other of said pairs having parallel spaced apart axes disposed at right angles to a plane passing through said above mentioned common axis when the ring is operated to a set up position; locking means for locking said net supporting ring in a set up position including a pin, means for rigidly connecting said pin to one end of said handle, each of the free ends of the segments joined by at least one of said pivotal connections having a common axis being formed with heads having a mating surface and a shoulder, said heads being bored in parallel spaced apart relation to said common pivotal axis, said bores being adapted to align and said shoulders on each of said heads being adapted to abut the head to which it is pivotally connected when said segments are operated to a set up position, said aligned bores being adapted to pass over said pin, and means for locking said ring on said pin whereby to rigidly lock said net supporting ring in a set up position at one end of said handle.

JAMES WILLIAM ASH.

REFERENCES CITED

The following references are of record in the file of this patent:

UNITED STATES PATENTS

| Number | Name | Date |
|---|---|---|
| 481,464 | Benson | Aug. 23, 1892 |

FOREIGN PATENTS

| Number | Country | Date |
|---|---|---|
| 456,581 | France | Aug. 29, 1913 |
| 85,613 | Germany | May 8, 1895 |
| 369,745 | Germany | Feb. 23, 1923 |
| 14,803 | Great Britain | 1888 |
| 15,490 | Great Britain | 1904 |